Patented Oct. 5, 1948

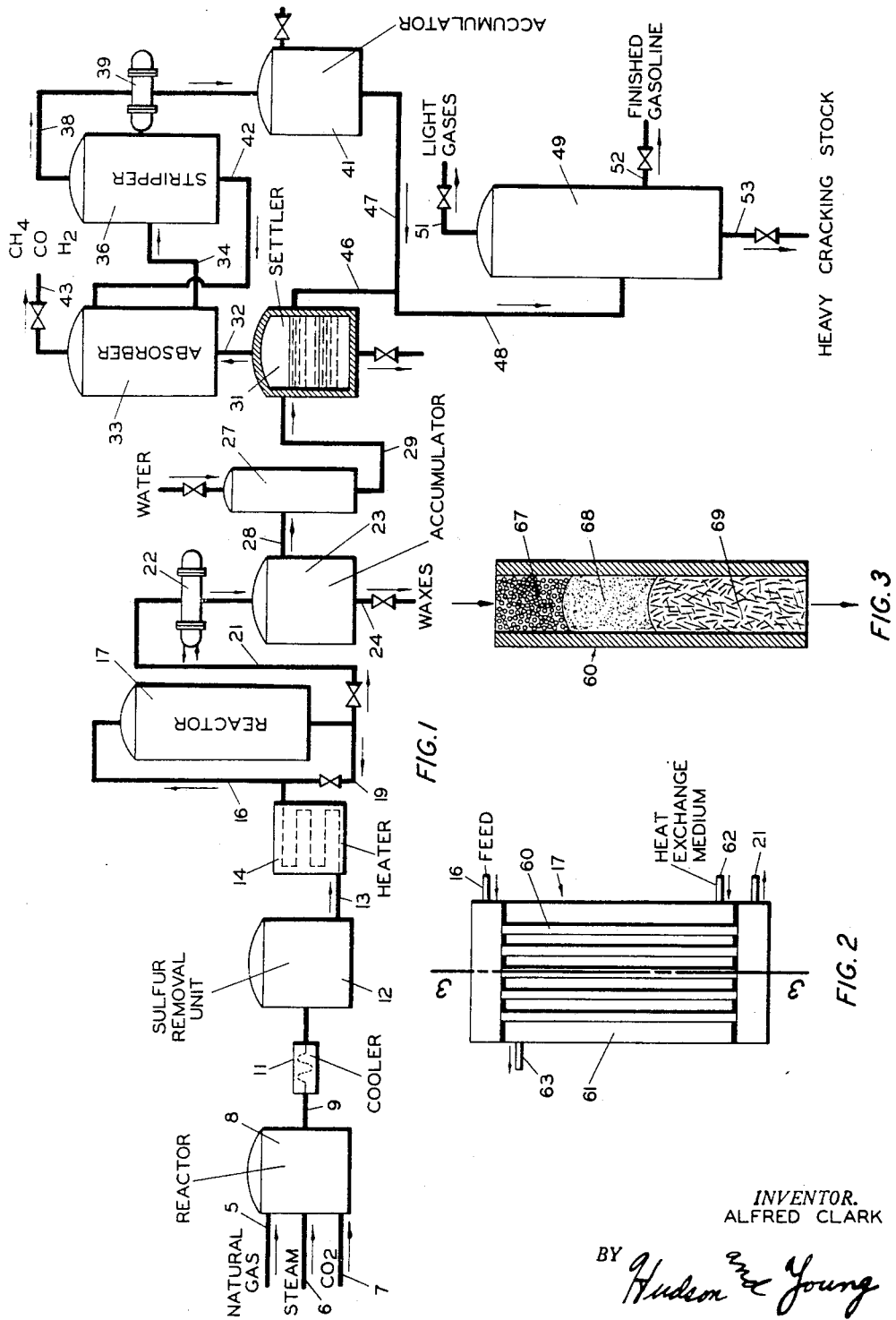

2,450,500

UNITED STATES PATENT OFFICE 2,450,500

SYNTHESIS OF HYDROCARBONS

Alfred Clark, Bartlesville, Okla., assignor to Phillips Petroleum Company, a corporation of Delaware Application September 5, 1945, Serial No. 614,578

7 Claims. (Cl. 260—449.6)

This invention relates to the synthesis of hydrocarbons. In one aspect this invention relates to the conversion of hydrogen and an oxide of carbon into hydrocarbons. In still another aspect this invention relates to the synthesis of hydrocarbons having more than one carbon atom per molecule by the interaction of hydrogen and carbon monoxide in the presence of a plurality of synthesis catalysts.

It has been known for some time that hydrogen and carbon monoxide may be made to react exothermically in the presence of certain catalysts and under specific reaction conditions to form hydrocarbons and oxygenated compounds. The formation of hydrocarbons having more than one carbon atom per molecule, especially those hydrocarbons boiling within the gasoline range, is favored by relatively low pressures and low temperatures. In general, the synthesis of hydrocarbons by the hydrogenation of carbon monoxide is accomplished in the presence of a metal chosen from the group VIII of the periodic table as a catalyst at pressures below about 500 pounds per square inch gage and at temperatures below about 350° C. The synthesis feed gas comprises a mixture of about 2 moles of hydrogen per mole of carbon monoxide and is prepared by the catalytic conversion of natural gas, steam and carbon dioxide. Characteristically, certain reaction conditions are optimum for the particular metal catalyst being used. Moreover, whether a normally gaseous, liquid or solid hydrocarbon is produced depends upon the reaction conditions, especially temperature, which are used to effect the synthesis. Accurate control of the reaction conditions and dissipation of excess heat liberated by the exothermic nature of the reaction are necessary to obtain an optimum yield of the desired product.

When hydrogen and carbon monoxide react to form hydrocarbons, part of which boil in the gasoline range, an amount of heat is evolved equivalent approximately to one-fifth of the heat of combustion of the original reactants converted. The liberation of large quantities of heat during the course of this reaction has presented a serious obstacle to the industrial use of this process, since it is essential to maintain the temperature of reaction within very narrow limits in order to obtain high yields of desirable products. Excessive rise in temperature during the reaction caused by the liberation of heat results in the formation of methane.

Both the hydrocarbon product and the heat of reaction of carbon monoxide and hydrogen are variable and depend on the catalyst and conditions of operation used. The formation of the methylene radical brings about an exothermic heat of reaction of about 48,000 calories per mole of methylene formed and is the minimum amount of heat that can be released from two moles of hydrogen reacting with one mole of carbon monoxide. However, in actual practice, the formation of higher hydrocarbons, such as by polymerization of methylene, brings about an additional heat of reaction which results in the liberation of heat exceeding 48,000 calories.

The application of thermodynamic principles to the hydrogenation of carbon monoxide indicates the feasibility of producing those hydrocarbons boiling within the gasoline range at accurately controlled temperatures. The approximate linear free energy-temperature relations for the synthesis of methane, ethane, normal hexene, normal hexane, and normal octane, are illustrated by the following over-all equations for reactions occurring in the gas phase with nickel or cobalt catalysts. These equations are represented graphically in "The Chemistry of Petroleum Derivatives," by Carleton Ellis, vol. II; 1934, page 1226.

$CO + 3H_2 = CH_4 + H_2O_{(g)}$; $\Delta F° = -51,300 + 56.2T$ $2CO + 5H_2 = C_2H_6 + 2H_2O_{(g)}$; $\Delta F° = -90,400 + 117.4T$ $6CO + 12H_2 = n-C_6H_{12(g)} + 6H_2O_{(g)}$; $\Delta F° = -211,400 + 316.3T$ $6CO + 13H_2 = n-C_6H_{14(g)} + 6H_2O_{(g)}$; $\Delta F° = -241,300 + 350.2T$ $8CO + 17H_2 = n-C_8H_{18(g)} + 8H_2O_{(g)}$; $\Delta F° = -317,500 + 466.6T$ The production of hydrocarbons from carbon monoxide and hydrogen is favored thermodynamically, as is evident from the large negative values of the standard free energy change for the over-all reactions. In the series, methane, ethane, normal hexane, and normal octane, the free energy change becomes more negative with the size of the molecule so that the formation of higher members of the series is quite feasible. At about 300° C., and atmospheric pressure, it should be possible to obtain any of the paraffin hydrocarbons by reduction of carbon monoxide in the presence of appropriate catalysts. The validity of this conclusion has been confirmed by the isolation and identification of some of the reaction products which included practically all the members of the aliphatic series from ethane to hectopentacontane ($C_{150}H_{302}$).

For a given catalyst, the free energy change for the production of hydrocarbons increases with temperature as is indicated from the above equations. This is true regardless of the nature of hydrocarbons formed. The equations indicate that upon increasing the temperature of reaction the free energy change becomes less negative. Assuming all reactions occurring at random, the product having the greatest negative free energy change will predominate. Thermodynamically the tendency to form the heavier hydrocarbons is greatest at relatively low temperatures. At relatively high temperatures the tendency to form methane is greatest, as previously indicated.

The close temperature control required coupled with the highly exothermic nature of the reactions involved presents a most difficult problem in operating on commercial scale. Various methods have been proposed to solve this problem, but with only limited success.

For example, it has been proposed to pass the reacting gases through a plurality of alternate zones containing catalyst and non-catalytic material situated within a reaction chamber, and removing heat of reaction through the walls of the reaction chamber whereby a temperature gradient along the path of the flowing gases is prevented.

It has also been proposed to circulate the reacting gases rapidly through the reaction zone thereby obtaining small conversion per pass and consequently only a small amount of heat liberated per pass.

Processes have also been disclosed wherein the exothermic heat of reaction is removed as it is evolved by utilizing a sufficient quantity of the catalyst and by absorbing the same as sensible heat of the catalyst, separating the heated catalyst from the reaction zone, removing the heat of reaction therefrom by cooling, and again utilizing the cooled catalyst in the reaction zone.

Other processes have been disclosed in which the reaction temperature is controlled by passing the synthesis gas mixture under synthesizing conditions through a plurality of alternate catalyst and cooling zones. The gas is contacted with a cooling liquid in the cooling zones to maintain the gas temperature within a predetermined temperature range.

Various processes have also been disclosed in the prior art wherein the reaction is conducted in a circulating fluid medium in direct contact with the catalyst. The fluid medium removes the heat of reaction as sensible heat and is then cooled and returned to the reaction chamber.

In catalytic processes for converting hydrogen and carbon monoxide to hydrocarbons, especially where use is made of alternate catalyst and cooling zones or alternate catalyst and non-catalyst zones for dissipation of heat of reaction, the size of the reaction chamber is disproportionally large for the amount of conversion which takes place therein in a given time. If, for example, fifty per cent of the volume of the reaction chamber is occupied by non-catalytic material or used as cooling zones, a reaction chamber twice as large would be required to obtain a certain space-time yield than would be required in a chamber in which the entire volume is filled with catalyst. Furthermore, if extremely high space velocities and recirculation of the unconverted reactants and gaseous products are employed in order to decrease the quantity of heat evolved, expensive, additional equipment is required for circulating the gases and for efficiently condensing liquid from a high-velocity gas stream. Catalyst erosion also increases when a high-velocity gas stream is employed. The use of a fluid circulating medium in direct contact with the catalyst involves the extra step of separating small volumes of liquid product from large volumes of fluid cooling medium. Bringing the reacting gases into indirect heat exchange with a circulating cooling liquid works well in tubes approximately one-half inch in diameter or less; but for tubes of larger diameter, the rate of heat dissipation is insufficient to maintain a constant temperature.

It is, therefore, an object of this invention to provide a method for effecting accurate control of the temperature of reaction in catalytic conversion processes without the aforesaid difficulties.

Still another object is to increase the proportion of a catalyst chamber occupied by the catalyst in an exothermal process for optimum yield of product.

It is also an object of this invention to provide a process wherein exothermic chemical reactions between reactants in the vapor phase may take place in a reaction chamber while at least a portion of the exothermic heat evolved at any point in the reaction chamber during reaction is utilized to heat the reactants to the appropriate reaction temperature.

Another object of this invention is to provide a process and apparatus for the interaction of hydrogen and carbon monoxide in which at least a portion of the exothermic heat of reaction evolved is dissipated as latent heat of vaporization of liquid products.

A further object of this invention is to provide a process for the reaction of hydrogen with carbon monoxide with a minimum formation of the normally gaseous hydrocarbons.

Still a further object of this invention is to provide a process whereby gaseous reactions involving hydrogen and carbon monoxide may be carried out adiabatically in a reaction chamber, except that the incoming and effluent streams will have a sensible heat content.

Other objects and advantages will become apparent to those skilled in the art from the accompanying description and disclosure.

It has been found that hydrocarbons having more than one carbon atom per molecule can be effectively produced by passing a gaseous mixture of hydrogen and an oxide of carbon through a plurality of catalyst zones in which each catalyst zone contains a suitable synthesis catalyst having an optimum activity for the formation of hydrocarbons having more than one carbon atom per molecule, in particular those hydrocarbons boiling in the motor fuel range, the catalyst in each zone being at a higher temperature than the catalyst of the preceding zone in the direction of flow of the gases through the plurality of zones. In general, the catalyst activity is varied from zone to zone in such manner that progressively increasing temperatures are required for each successive zone in the direction of flow of gases therethrough to maintain optimum conversion in each zone for the desired hydrocarbon product.

A particularly novel feature of this invention is that the problem of heat and temperature control in the exothermic process of hydrogenating carbon monoxide to valuable hydrocarbons is solved, not by dissipating the heat in one manner or other, but by utilizing this exothermic heat to gradually increase the temperature of the flowing gases and the catalyst itself in the direction of flow of the gases. The increase in temperature of the flowing gases and the catalyst in the direction of flow is compensated and utilized by selecting a plurality of catalysts placed in more or less successive zones wherein each successive catalyst possesses a higher optimum temperature of reaction than the preceding catalyst.

In using the particular arrangement of catalyst as expressed in this invention, a portion of the exothermic heat of reaction may be transformed into latent heat of vaporization of those products, which, having formed and condensed to liquids, gradually vaporize as they flow into catalyst zones of higher temperature. In this manner, a partial control of the total rise in temperature is maintained and this control becomes greater the higher the maximum allowable difference between inlet and outlet temperatures of the catalyst bed. This control increases also with increase in quantity of product produced in the reaction chamber which vaporizes in the temperature range defined by the inlet and outlet temperatures of the catalyst bed.

In practicing this invention, it is possible to use reaction chambers considerably larger in diameter than those normally used in the hydrogenation of carbon monoxide while comparable yields of valuable hydrocarbon products are obtained without the production of abnormal quantities of methane and other undesirable normally gaseous hydrocarbons.

Since the approach to maximum efficiency is the approach to an adiabatic process in which no heat is added or removed from the process, the present invention represents as close a realization to such efficiency as can be expected on commercial scale. Under some conditions of operation it may be possible to utilize substantially all the exothermic heat of reaction without external means for heating or cooling the gases during reaction. The sensible heat of the gases leaving the reaction may be utilized to preheat the entering reactants.

The actual operation of a process embodying the present invention ultimately depends upon the several catalysts chosen to comprise the reaction zone in order to give the desired hydrocarbon product, which is, generally, normally liquid hydrocarbons. Appropriate catalysts are those which have substantial hydrogenating power at low temperatures. Such catalysts comprise a metal or compound of a metal from group VIII of the periodic table, such as iron, nickel and cobalt. Cerium, manganese, thorium, palladium, titanium, zinc, and the oxides and other compounds of these metals have been found to possess the necessary characteristics suitable for hydrogenating carbon monoxide to hydrocarbons. Mixtures of such catalysts may be employed or suitable agents or carriers may be impregnated with the catalysts to increase their efficiency and strength. The catalysts are usually in a finely divided form, such as pellets or granules.

The table below shows the reaction conditions of temperature, pressure, and space velocity characteristic of some of the various catalysts which may be used in effecting the desired results of the present invention.

TABLE

*Properties and preferred ranges of operation of some common catalysts for the production of synthetic hydrocarbons*

| | Catalyst | Composition, Parts by weight | Temperatures, °C. | | Pressures, p. s. i. g. | | Space Velocities, vols./vol. catalyst/hr. | | Anticipated Products |
|---|---|---|---|---|---|---|---|---|---|
| | | | Broad Range | Pref. Range | Broad Range | Pref. Range | Broad Range | Pref. Range | |
| 1 | Cobalt-Thoria | Co—100; $ThO_2$—18; Diatomaceous Earth—100. | 180-250 | 190-210 | 15-500 | 100 | 80-150 | 90-110 | Light hydrocarbons to waxes. |
| 2 | Iron-Alkali and/or Copper. | Alkali <2 wt. %; Copper 15-25 wt. %. | 210-280 | 230-260 | 15-500 | 75-300 | 80-150 | 90-110 | Do. |
| 3 | Sintered Iron | All Iron; Traces of Alkali—1 wt. %. | 265-350 | 310-330 | 15-500 | 220-300 | [1] 200-400 | 250-300 | Do. |
| 4 | Ruthenium | Ruthenium on support; Ru=10 wt. %. | 180-250 | 190-210 | 1000-2000 | 1200-1500 | 80-150 | 90-110 | Predominantly waxes. |
| 5 | Nickel-Thoria | Ni—100; $ThO_2$—18; Diatomaceous Earth—100. | 175-220 | 190-210 | 15-100 | 15-50 | 80-150 | 90-110 | Light hydrocarbons to waxes. |
| 6 | Nickel-Manganese-Alumina. | Ni—59; $Mn_3O_4$—50; $Al_2O_3$—51; Diatomaceous Earth—24. | 175-220 | 190-210 | 15-100 | 15-50 | 80-150 | 90-110 | Do. |
| 7 | Cobalt | Less than 10% by weight of extraneous material. | 175-220 | 180-200 | 15-500 | 100 | 80-150 | 95-115 | Do. |

[1] Recycle to Feed Ratio 25-100:1.

The sintered iron catalyst is prepared by heating to 500-800° C. in an atmosphere of hydrogen. The catalyst is not as sensitive to temperatures. Iron is precipitated with ammonia or caustic soda.

The best forms of the nickel-thoria catalyst are obtained by co-precipitating with potassium carbonate and heating with boiling water for the partial decomposition of the carbonate.

By the nature of this invention, the temperatures of reaction employed may vary over a considerable range. The actual temperature range will depend upon a number of conditions such as the activities of the catalyst in the various zones, the extent of conversion, the velocity of gas flow, etc. All of these conditions are interdependent and must be so integrated to give the desired yield of liquid and solid hydrocarbons. In practice several catalysts which differ in the temperature required for optimum production of normally liquid hydrocarbons are selected. These catalysts are arranged in a reaction chamber in the order of increasing temperature requirements in the direction of flow of the entering gases so that the catalyst having the lowest optimum reaction temperature is present only in that portion of the reaction chamber which experiences the lowest temperature, and conversely for the catalyst having the highest optimum reaction temperature. The inlet gas mixture of hydrogen and carbon monoxide may be preheated to approximately the optimum reaction temperature of the initial catalyst zone, for example about 190° C., and the rate of flow of gases adjusted by trial to obtain an exit gas temperature corresponding to the optimum required for efficient operation over the final catalyst zone, for example about 350° C. Temperature determinations may then be made throughout the length of the catalyst bed in order to make final adjustments according to the ratios of catalyst of different activities so that each catalyst will be operating in the temperature range most suitable to it. This last step is comparatively simple to perform by regulating the space velocity of the gas within the allowable limits for the catalysts present. Under these conditions, the operating temperature of each catalyst zone is not too critical and may cover a range of as much as about 20 to about 30° C. or even more above or below the optimum temperature. At relatively low space velocities, the optimum temperature range of each catalyst zone is narrower, even as small as about 5 to about 10° C. above or below the optimum temperature. Under conditions of a low space velocity a more careful distribution of the catalyst zones must be made, or a reaction tube somewhat smaller in diameter used wherein part of the excess heat of reaction is dissipated through the surface of the reaction chamber with the aid of external cooling means, if necessary.

In general, then, temperatures ranging from about 150° C. at the inlet end to about 400° C. at the outlet end are used. The preferred temperature range is, however, from about 180 to about 350° C., or a minimum temperature difference between inlet and outlet of the catalyst chamber of about 10° C. and a maximum of about 170° C.

In carrying out the process of this invention, pressures ranging from sub-atmospheric to as high as about 2000 pounds per square inch gage may be used, but the preferred range is from about 50 to about 500 pounds per square inch gage, more particularly from about 100 to about 125 pounds per square inch gage.

The rate of flow or space velocity of the inlet gas mixture will be dependent on the activity of the various catalyst zones and on the temperature range from inlet to outlet of the catalyst chamber desired as previously indicated. Therefore, space velocities may be varied over a considerable range from low velocities of approximately 80 cubic feet per cubic foot of catalyst per hour such as are used normally over cobalt catalysts, up to about 400 or even as high as 30,000 cubic feet per cubic foot of catalyst per hour, such as are used over the sintered iron catalysts. These figures represent the extremes in space velocities which may be used in carrying out this invention. Space velocity may be defined as volumes of gas at standard conditions of temperature and pressure per volume of catalyst per hour.

The composition of the synthesis feed gas is normally in a molar ratio of hydrogen to carbon monoxide between about 3 to 1 and about 1:1, however, for optimum yield of normally liquid hydrocarbons a ratio between about 2:1 and about 3:2 is preferred.

Upon use the catalysts may decrease in activity as the result of deposition of carbonaceous deposits thereon. Regeneration of the catalysts may be effected in conventional manner, such as by treatment with hydrogen at elevated temperatures.

By the process of this invention remarkably higher yields have been observed than obtained by conventional methods. Thus, using one converter a yield as high as about 1.5 gallons of normally liquid products have been obtained per 1000 cubic feet of synthesis gas as compared to about 1 gallon per 1000 cubic feet of synthesis gas when using only a single cobalt-thoria catalyst in a reaction zone of uniform activity. Of the total hydrocarbon product, the normally liquid hydrocarbons constituted as high as about 75% by weight.

Figure 1 of the drawing diagrammatically represents apparatus for a typical process for the synthesis of hydrocarbons in which an embodiment of the present invention is applicable.

Figure 2 diagrammatically represents the construction of reaction zone 17 of Figure 1 in which an embodiment of the present invention may be incorporated, and is shown in cross section.

Figure 3 represents diagrammatically a cross-section of element 60 of Figure 2 along line 3—3.

In order that this invention may be more clearly understood and its applicability realized, a brief description of a typical process for the synthesis of hydrocarbons will be illustrated. Natural gas containing methane, steam and carbon dioxide obtained from suitable sources are introduced into reactor 8 through lines 5, 6 and 7, respectively. Hydrogen and carbon monoxide are formed in reactor 8 at approximately atmospheric pressure and at a temperature between about 700 and about 800° C. The effluent from reactor 8 contains hydrogen and carbon monoxide in a molar ratio of about 2:1, and about 0.5 to about 1.0 mole per cent impurities, such as sulfur.

From reactor 8, the effluent passes to sulfur removal unit 12 by line 9 and through cooler 11. Both inorganic and organic sulfur are removed from the effluent in unit 12 by conventional methods known in the art. Inorganic sulfur may be removed by solvent extraction with an amine solution. Organic sulfur compounds are decomposed in the presence of a suitable catalyst, such as a copper oxide-lead chromate combination, at an elevated temperature of about 400° C. The resulting hydrogen sulfide from the decomposition is removed by solvent extraction. The purified effluent of hydrogen and carbon monoxide is then passed to heater 14 by line 13 and thence to reactor 17 by line 16.

In reactor 17, hydrocarbons are synthesized under reaction conditions similar to those previously described and in the presence of a plurality of catalysts. Reactor 17 will be more fully described hereinafter with reference to Figures 2 and 3 of the drawings.

From reactor 17 an effluent containing hydrocarbons is passed to cooler 22 via line 21 where partial condensation is effected and the condensate is collected in accumulator 23 and discharged therefrom through line 24. A portion of the effluent may be recycled to reactor 17 via line 19, if desired. This condensate comprises heavy hydrocarbons and waxes. The temperature of the effluent gases leaving reactor 17 is about 200° C. and cooling the gases to about 150° C. is sufficient to accomplish the degree of partial condensation desired in accumulator 23. The uncondensed gases from accumulator 23 are passed to cooling tower 27 by line 28 wherein the gases are condensed by a spray of water which cools them to about 25° C. Water and liquid hydrocarbons are withdrawn from tower 27 through line 29 and are passed to settler 31 for a liquid phase separation between hydrocarbons and water.

Uncondensed gases leave settler 31 through line 32 and pass to mineral seal oil absorber 33. Recovery of propane, butane and heavier hydrocarbons is effected in absorber 33 by absorption of these hydrocarbons in mineral seal oil in the conventional manner. The hydrocarbon-rich mineral seal oil is withdrawn from the lower portion of absorber 33 and passed to a stripping column 36 via line 34. The light hydrocarbons, such as propane, butane, etc., are stripped from the mineral seal oil by lowering the pressure or heating in stripping column 36. Recovered hydrocarbons from stripping column 36 are passed via line 38 and condenser 39 to accumulator 41. Stripped mineral seal oil is recirculated to absorber 33 by means of line 42. Light gases such as hydrogen, methane, carbon monoxide, are removed from absorber 33 through line 43 and discarded or used as fuel, if desired. These gases may also be passed to a second and smaller reactor (not shown) for the conversion of the remaining hydrogen and carbon monoxide to hydrocarbons.

Liquid hydrocarbons from settler 31 and accumulator 41 are passed via lines 46, 47 and 48 to fractionator 49 wherein desired products are separated and recovered. Light gases are withdrawn from fractionator 49 through line 51. Hydrocarbons boiling within the gasoline range are withdrawn through line 52, and heavier hydrocarbons are removed by line 53.

Referring to Figure 2, the feed gas comprising hydrogen and an oxide of carbon is introduced into catalyst reaction zone 17 by means of feed line 16. The gas flows downward through reaction zone 17 and tubes 60 which contain successive layers of catalysts under temperature and pressure conditions adapted to produce hydrocarbon constituents containing more than one carbon atom per molecule, and an effluent is withdrawn from reaction zone 17 by means of line 21. Suitable catalysts and conditions of reaction for use in the present invention are illustrated in the table. This effluent withdrawn by means of line 21 may be handled in any manner desirable for the separation of the desired liquid products from the unsynthesized gases, inert gases and undesirable by-products. A portion of the heat of reaction is removed from reaction zone 17 and partial temperature control is accomplished by means of a suitable cooling medium, such as water, mineral seal oil, etc., which is introduced into cooling jacket 61 surrounding tubes 60 through line 62. The cooling fluid is withdrawn from jacket 61 by means of line 63 and may be cooled and recirculated to jacket 61. The temperature of the cooling medium flowing in jacket 61 is preferably equal to the temperature of the upper portion of catalyst tubes 60, but may be equal to that of the lower portion of catalyst tubes 60 or even lower or higher than either of these temperatures, or intermediate.

The feed synthesis gas flows downward through reaction zone 17 and tubes 60 and contacts successive beds of catalytic material as shown in Figure 3, each requiring successively higher temperatures for optimum yield of the desired hydrocarbon product. Thus the feed gas contacts catalyst zones 67, 68 and 69 of Figure 3 in the manner described. The synthesis gas is introduced into the reaction zones preferably under conditions at which the desired reaction will be initiated. After the synthesis gas contacts the catalyst zone 67, the reaction proceeds with the evolution of exothermic heat and a corresponding rise in temperature of the gases in the reaction zone. Thus as unreacted synthesis gas and products emerge from the catalyst zone 67, an appreciable rise in temperature has occurred. A portion of the heat is removed through the walls of tubes 60 to the cooling fluid in jacket 61, but the temperature of the gas entering catalyst zone 68 is substantially higher than the entering temperature to catalyst zone 67. In accordance with the present process, gas then passes through catalyst zone 68 wherein the catalyst is so prepared as to require a higher temperature than the catalyst in zone 67 to assure an optimum yield of product and wherein time of contact favors the formation of relatively heavy hydrocarbons. In a similar manner the gas successively passes through catalyst bed 69 and as many additional zones as desired, and then is withdrawn from reactor 17 by means of line 21.

The catalyst zones may be of the same depth. However, it is advantageous to arrange the size and disposition of each catalyst zone and even the size of the catalyst particles so as to promote optimum yield under the particular conditions of temperature, concentration of reactant and rate of reaction which develop therein and which depend on the initial conditions of temperature concentration, and throughput chosen. A particularly desirable arrangement with respect to the catalyst beds is to arrange these beds in a manner that the center portions of the flowing synthesis gases first enter the succeeding bed and the outer portions of the flowing synthesis gases in contact with the tube wall chamber of the cooling jacket last enter the succeeding bed, as shown diagrammatically in Figure 3. The size of the catalyst particles may be varied so as to control the space velocity in each of the independent catalyst zones to assure optimum conditions for the particular catalyst within the zone.

The catalyst zones need not be completely separated; consequently in some cases, a gradual transition in optimum temperature requirements may exist by mixing the various catalysts in such a manner that the higher temperature catalysts gradually increase in proportion in the direction of flow of synthesis gas. It is only necessary that the optimum activity of the catalyst for synthesis of the particular desired product vary in such a manner that increasing temperatures are required in the direction of flow of synthesis gas through a reaction chamber containing the catalyst or catalysts.

When a small catalyst chamber of uniform activity is used, the reactor tubes are approximately ¾ inch internal diameter and means are provided to effect external cooling in order to maintain approximately isothermal conditions. Upon progressively changing the catalyst activity throughout the catalyst chamber as proposed in this invention, the diameter of the reactor tubes can be increased within certain limits inasmuch as the temperature rise is progressively increased in the direction of gas flow and a gradual increase in temperature is highly desirable. The use of a larger reactor tube diameter would tend to approach adiabatic conditions necessitating greater heat dissipation. This invention depends in part on this principle. This disclosure contemplates only partial or no heat dissipation by cooling means. Heat is dissipated as latent heat of vaporization or is allowed to increase the sensible heat of the gases. This invention is intermediate an adiabatic and isothermal process. A series of tubes having a 3 inch internal diameter and connected in parallel are preferred. Tubes of greater diameter will tend to accumulate part of the heat of reaction resulting in too high a temperature rise of the effluent gases. Tubes of very small diameter would tend to approach isothermal conditions, thus tubes having an internal di ameter greater than ¾ of an inch are preferred. In general, the more heat dissipation required, the smaller the tube diameter necessary in order to offer a greater heat transfer area.

The object of this invention is not completely that of heat dissipation. In heating up the reactants and reaction products as they progress through the tube, a situation may arise when the heat exchanger liquid may be at a higher temperature if the conversion per pass is low and more heat must be supplied in order to increase the temperature of the reaction gases to the optimum temperature for each successive zone. Should the reaction gases enter the reactor above the optimum temperature, the heat exchange fluid should be at a lower temperature to dissipate the excess heat and conversely.

EXAMPLE

Synthesis gas comprising 3 moles of hydrogen and 2 moles of carbon monoxide at a pressure of 200 pounds per square inch gage is heated by means of a gas-fired furnace to 180° C. and then is introduced and made to flow downward into and through a plurality of tubes connected in parallel and packed with catalyst. The tubes are of seamless carbon steel and have the following dimensions: inside diameter—3 inches and length—10 feet. Each of the tubes is packed with three different layers of cylindrical catalysts. The catalyst is in the form of pellets measuring approximately ⅛ inch in diameter and ⅛ inch in height. The progressive order of the catalysts upward is sintered iron, iron, and cobalt-thoria; the catalyst layers are respectively 4, 3 and 3 feet in height.

The preheated synthesis gas enters the reaction zone at the top at 200 pounds per square inch gage and 180° C. and is made to flow downward through the catalyst. The space velocity of the synthesis gas is maintained at 150 vols./vol of cat./hr. The reactants and products of formation resulting from the reaction become progressively hotter as they are made to flow downward through the length of the tube. The temperature of the reaction at the cobalt-thoria and iron catalyst junction is 205° C. and at the iron-sintered iron catalyst junction 260° C. The effluent gas leaving the reactor is at a temperature of 320° C.

The exterior of the catalyst tubes is contacted with liquid mineral seal oil which flows upward through the shell-side of the reactor and countercurrently to the gas flow. A mineral seal oil entrance temperature of about 205° C. is maintained and the rate of flow is adjusted to keep the above prescribed catalyst junction temperatures. The gases leaving the converter at 320° C. and 200 lbs. are cooled and condensed. An analysis of the converted products shows 70% conversion. The composition of the converted products is as follows: A light hydrocarbon fraction comprising 86 weight per cent of the total, and including hydrocarbons ranging from propane to hydrocarbons having a boiling point of about 200° C. The heavier fraction of 14 weight per cent of the total comprises 13 per cent liquid hydrocarbons having an initial boiling point of about 200° C. and 1 weight per cent waxes.

Various other combinations of catalysts may be used, as for example successive layers of cobalt, a nickel-thoria combination, and iron, or a nickel-thoria combination, iron, and sintered iron, without departing from the scope of this invention.

The present invention may be varied widely and various modifications will become apparent to those skilled in the art without departing from the scope thereof. The invention essentially comprises passing reactants through a plurality of catalyst zones successively requiring increased temperatures for the optimum promotion of the reaction desired. It is particularly adapted to exothermic processes wherein the reactant mixture progressively increases in temperature in the direction of flow of the reactants. The invention is especially useful in the synthesis of hydrocarbons from hydrogen and an oxide of carbon.

I claim:

1. A process for the synthesis of normally liquid hydrocarbons, which comprises passing a gaseous mixture comprising hydrogen and carbon monoxide through a reaction zone in the presence of a plurality of catalysts, said catalysts comprising a cobalt-thoria synthesis catalyst, an iron synthesis catalysts, and a sintered iron synthesis catalyst separately arranged in successive zones, said gaseous mixture being passed through said zones of catalyst in the order of cobalt-thoria, iron, and sintered iron under conditions such that the temperature of said gaseous mixture progressively increases from catalyst zone to catalyst zone, maintaining the molar ratio of hydrogen to carbon monoxide in said gaseous mixture entering said reaction zone between about 2:1 and about 3:2, maintaining a pressure in said reaction zone between about 15 and about 500 pounds per square inch gage, maintaining a temperature in said cobalt-thoria catalyst zone between about 180 and about 250° C., in said iron catalyst zone between about 210 and about 280° C., and in said sintered iron catalyst zone between about 265 and about 350° C., maintaining a space velocity of gases in said reaction zone between about 100 and about 400, withdrawing an effluent from said reaction zone containing said hydrocarbons, and separating said hydrocarbons from said effluent.

2. A process for the synthesis of normally liquid hydrocarbons, which comprises passing a gaseous mixture comprising hydrogen and carbon monoxide through a reaction zone in the presence of a plurality of catalysts, said catalysts comprising a cobalt synthesis catalyst, a cobalt-thoria synthesis catalyst, and an iron synthesis catalyst separately arranged in successive zones, said gaseous mixture being passed through said zones of catalyst in the order of cobalt, cobalt-thoria, and iron under conditions such that the temperature of said gaseous mixture progressively increases from catalyst zone to catalyst zone, maintaining the molar ratio of hydrogen to carbon monoxide in said gaseous mixture entering said reaction zone between about 2:1 and about 3:2, maintaining a pressure in said reaction zone between about 15 and about 500 pounds per square inch gage, maintaining a temperature in said cobalt catalyst zone between about 175 and about 220° C., in said cobalt-thoria catalyst zone between about 180 and about 250° C., and in said iron catalyst zone between about 210 and about 280° C., maintaining a space velocity of gases in said reaction zone between about 100 and about 400, withdrawing an effluent from said reaction zone containing said hydrocarbons, and separating said hydrocarbons from said effluent.

3. A process for the synthesis of normally liquid hydrocarbons, which comprises passing a gaseous mixture comprising hydrogen and carbon monoxide through a reaction zone in the presence of a plurality of catalysts, said catalysts comprising a nickel-thoria synthesis catalyst, an iron synthesis catalyst, and a sintered iron synthesis catalyst separately arranged in successive zones, said gaseous mixture being passed through said zones of catalyst in the order of nickel-thoria, iron, and sintered iron under conditions such that the temperature of said gaseous mixture progressively increases from catalyst zone to catalyst zone, maintaining the molar ratio of hydrogen to carbon monoxide in said gaseous mixture entering said reaction zone between about 2:1 and about 3:2, maintaining a pressure in said reaction zone between about 15 and about 500 pounds per square inch gage, maintaining a temperature in said nickel-thoria catalyst zone between about 175 and about 220° C., in said iron catalyst zone between about 210 and about 280° C., and in said sintered iron catalyst zone between about 265 and about 350° C., maintaining a space velocity of gases in said reaction zone between about 100 and about 400, withdrawing an effluent from said reaction zone containing said hydrocarbons, and separating said hydrocarbons from said effluent.

4. A process for the synthesis of hydrocarbons having more than one carbon atom per molecule, which comprises passing a gaseous mixture comprising hydrogen and carbon monoxide through a reaction zone in the presence of a plurality of catalysts under conditions suitable for said synthesis, said catalysts comprising a cobalt-thoria synthesis catalyst, an iron synthesis catalyst, and a sintered iron synthesis catalyst separately arranged in successive zones, said gaseous mixture being passed through said zones of catalysts in the order of cobalt-thoria, iron, and sintered iron, progressively increasing the temperature of said gaseous mixture from catalyst zone to catalyst zone corresponding approximately to the optimum temperatures of each of said catalyst zones but maintaining said temperature within the range of about 150° and 400° C., withdrawing an effluent from said reaction zone containing said hydrocarbons, and separating said hydrocarbons from said effluent.

5. A process for the synthesis of normally liquid hydrocarbons, which comprises passing a gaseous mixture comprising hydrogen and carbon monoxide through an elongated reaction zone of between about ¾ inch and about 3 inches in cross-section under reaction conditions in the presence of a series of hydrocarbon synthesis catalysts comprising cobalt-thoria, iron, and sintered iron and arranged in separate zones across the line of gas flow in the order named, said order corresponding with the ascending order of temperatures at which said catalysts inherently exhibit optimum activity in the synthesis of said hydrocarbons, maintaining progressively increasing temperatures along the line of gas flow through said reaction zone substantially corresponding to said temperatures of optimum activity for each catalyst by utilizing heat of reaction generated along said line of flow, absorbing substantially all of the heat of reaction of said synthesis in gases and catalysts in said reaction zone, withdrawing an effluent containing said hydrocarbons from said reaction zone, and recovering said hydrocarbons.

6. A process for the synthesis of normally liquid hydrocarbons which comprises passing a gaseous mixture comprising hydrogen and carbon monoxide through an elongated reaction zone of between about ¾ inch and about 3 inches in cross-section under reaction conditions in the presence of a series of hydrocarbon synthesis catalysts selected from the group consisting of cobalt, cobalt-thoria, nickel-thoria, iron, and sintered iron and selected and arranged in separate zones across the line of gas flow in the order corresponding with the ascending order of temperature at which said selected catalysts inherently exhibit optimum activity in the synthesis of said hydrocarbons, maintaining progressively increasing temperatures along the line of gas flow through said reaction zone substantially corresponding to said temperatures of optimum activity for each catalyst by utilizing heat of reaction generated along said line of flow, maintaining thermal conditions within said reaction zone intermediate adiabatic and isothermal, withdrawing an effluent containing said hydrocarbons from said reaction zone, and recovering said hydrocarbons.

7. The process of claim 6 in which the temperature of the feed gas is maintained above about 150° C. and the temperature of the effluent is maintained below about 400° C.

ALFRED CLARK.

REFERENCES CITED

The following references are of record in the file of this patent:

UNITED STATES PATENTS

| Number | Name | Date |
| --- | --- | --- |
| 1,741,306 | Jaeger | Dec. 31, 1929 |
| 2,142,678 | Porter | Jan. 3, 1939 |
| 2,279,153 | Wilcox | Apr. 7, 1942 |

OTHER REFERENCES

Ellis, "Chemistry of Petroleum Derivatives," vol. II, page 1226, Reinhold, New York, 1937.